March 11, 1924.
G. D. GEORGE
DECOY
Filed Jan. 16, 1922
1,486,329
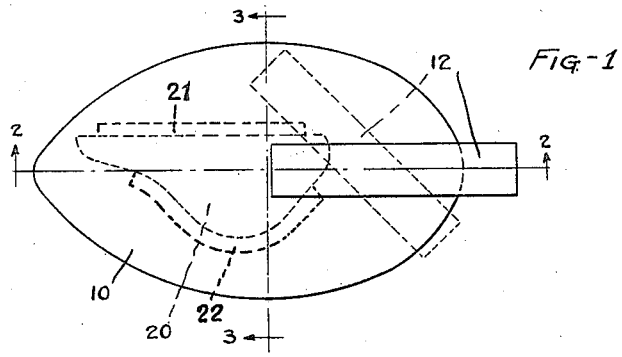
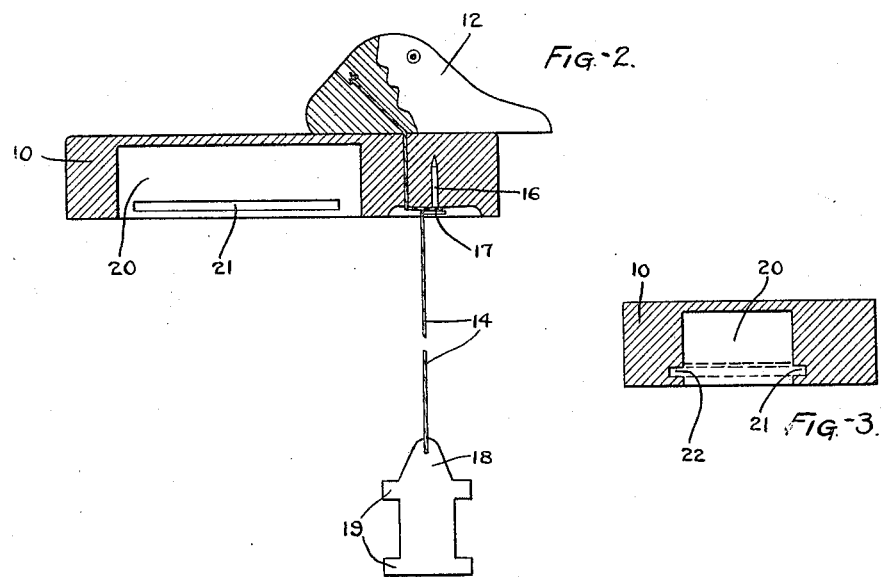
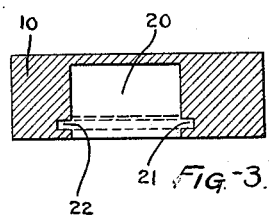
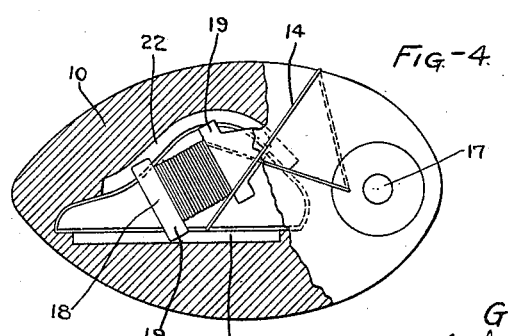
INVENTOR:
GILBERT D. GEORGE.
BY Whiteley and Ruckman
ATTORNEYS Patented Mar. 11, 1924.

1,486,329

UNITED STATES PATENT OFFICE.

GILBERT D. GEORGE, OF ST. PAUL, MINNESOTA.

DECOY.

Application filed January 16, 1922. Serial No. 529,465.

*To all whom it may concern:*

Be it known that I, GILBERT D. GEORGE, a citizen of the United States, residing at St. Paul, in the county of Ramsey and State of Minnesota, have invented certain new and useful Improvements in Decoys, of which the following is a specification.

My invention relates to decoys, and an object is to provide a device which is made in simulation of water fowl such as ducks, and which when not in use for decoy purposes may be placed in packed or collapsed condition so as to occupy a small space for storage and transportation. Another object is to provide a decoy in which a separate head member may be positioned upon the forward portion of a body member with any desired degree of angular adjustment and firmly held in such position when the device is placed upon the water, so that the relative position of the head in connection with the body will not be affected by the action of wind and waves.

The full objects and advantages of my invention will appear in connection with the detailed description, and the novel features of my inventive idea will be particularly pointed out in the claims.

In the accompanying drawings, Fig. 1 is a top plan view of my decoy. Fig. 2 is a view in vertical section on the line 2—2 of Fig. 1. Fig. 3 is a view in vertical section on the line 3—3 of Fig. 1. Fig. 4 is a bottom view partly in horizontal section and showing the decoy in packed condition.

As shown in the drawings my decoy includes a body member 10 of material sufficiently light to float on the water, being preferably of wood. The outline of the body member corresponds to that of a fowl such as a duck when such fowl is resting upon the water. The top surface of the body member is flat and may have a representation of wings painted thereon. In this connection, it may be observed that the provision of a flat upper surface is sufficient since the body member even if round would appear flat when viewed from above. A head member 12 is provided which has one end of a cord 14 secured thereto, this cord passing through a vertical opening in the forward portion of the body member. When the head member has been turned into the desired position, the cord is given a turn or two around the protruding end of a nail or pin 16 having a head 17 and driven into the forward portion of the body member adjacent the opening therein through which the cord 14 passes. By pulling the cord taut, the head member will be held firmly in place with any desired angular adjustment. In this manner, a more lifelike appearance may be given to a group of the decoys placed on the water since no two of them need necessarily appear to be looking in exactly the same direction. A flat anchoring weight 18 is fastened upon the other end of the cord 14 and this weight is provided with lugs 19 so that the cord may be readily wrapped around the weight for packing purposes. The body member 10 is hollowed out underneath to provide a recess 20 of the proper shape and depth to receive the head member when detached. Near the bottom of the recess 20 there are two grooves 21 and 22. When the head member has been placed in the recess 20, the weight 18 with the cord wound thereon is placed in the position shown in Fig. 4 with the lugs 19 pushed into the grooves 21 and 22 so that the head member, the weight and the cord are securely held in packed condition. The decoy is then in convenient form for transporting and a considerable larger number of them may be carried in a convenient space than would be possible if the head member and body member were made integral or non-detachable.

The operation and advantages of my invention will be obvious in connection with the foregoing description. When the decoy is to be used after being in packed condition, the weight is slid so as to remove the lugs 19 from the grooves 21 and 22 whereupon the stored parts may be taken from the recess 20 and placed in assembled condition as shown in Fig. 2. The head is placed upon the forward portion of the body member in any desired angular position and upon pulling the cord 14 and wrapping it once or twice around the pin 16, the head will be secured in the position in which it was placed. As will be obvious the head before it is secured may be rotated through the entire 360° of circumference of a circle. When the head has been secured the weight 18 is dropped into the water so that the decoy will be held at the place where it has been placed on the water.

I claim:

1. A decoy comprising a body member, a separate head member adapted to be placed on the forward portion of said body member, an anchoring weight, a cord passing through an opening in said body member and secured at its opposite ends to said head member and said weight, and means carried by said body member for securing said cord and holding said body and head member fixedly together in adjusted position.

2. A decoy comprising a body member, a separate head member adapted to be placed on the forward portion of said body member, an anchoring weight, a cord passing through an opening in said body member and secured at its opposite ends to said head member and said weight, and means carried by said body member to which said cord may be secured for holding said head member in place, said body member having a recess adapted to receive said head member and also having grooves with which said weight is adapted to be engaged for holding said head member in said recess.

3. A decoy comprising a body member, a separate head member adapted to be placed on the forward portion of said body member with any degree of angular adjustment, a flat anchoring weight, a cord passing through an opening in said body member and secured at its opposite ends to said head member and said weight, and a pin carried by said body member around which said cord may be wrapped to secure said head member in any desired adjusted position, said body member having a recess adapted to receive said head member and also having grooves with which said weight is adapted to be engaged for holding said head member in said recess.

4. A decoy comprising a body member, a separate head member, an anchoring weight, a cord passing through an aperture in the forward part of the body member and permanently secured at its ends to the head and the weight, and means for securing a portion of the cord to the underside of the body member so as to hold the head in fixed position.

5. A decoy comprising a body member, a separate head member, an anchoring weight, a cord passing through an aperture in the forward part of the body member and permanently secured at its ends to the head and the weight, and a chamber in the body adapted to receive and store the head and being provided with grooves in the body extending about the outer portion of the chamber, and said weight having portions adapted to engage within said grooves to hold the head and weight in the chamber without detaching the cord.

In testimony whereof I hereunto affix my signature.

GILBERT D. GEORGE.